Figure 1:
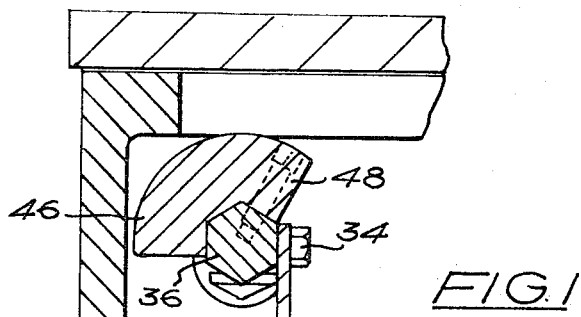

United States Patent [19]

Davison

[11] 3,783,893
[45] Jan. 8, 1974

[54] PIVOTED WEIGHT BIASED VALVE

[75] Inventor: George Robert Davison, Chesterfield, England

[73] Assignee: The Bryan Donkin Company Limited, Chesterfield, Derbyshire, England

[22] Filed: Nov. 20, 1972

[21] Appl. No.: 307,785

[30] Foreign Application Priority Data
Nov. 26, 1971 Great Britain..................55076/71

[52] U.S. Cl............... 137/527.8, 251/298, 251/303, 137/527
[51] Int. Cl............................................ F16k 15/03
[58] Field of Search............. 137/527, 527.2, 527.4, 137/527.6, 527.8; 251/298, 299, 303

[56] References Cited
UNITED STATES PATENTS

| | | | |
|---|---|---|---|
| 2,282,532 | 5/1942 | Shenk | 137/527.4 |
| 623,478 | 4/1899 | Keene | 137/527.8 X |
| 2,048,088 | 7/1936 | Wagner | 137/527.8 X |
| 2,665,088 | 1/1954 | Lobelle | 251/251 X |
| 3,075,547 | 1/1963 | Scaramucci | 137/527.2 X |
| 3,268,202 | 8/1966 | Murray et al. | 251/303 |

*Primary Examiner*—William R. Cline
*Attorney*—Browdy and Neimark

[57] ABSTRACT

A non-return valve having a closure member which pivots on knife-edged bearing portions in contact with flat bearing plates. Aligning means are provided to align the closure member with the valve seat. The valve plate is biased by an upstanding balance weight and a removable domed closure cap is provided to house the balance weight and provide access to the valve.

4 Claims, 7 Drawing Figures

SHEET 1 OF 5

PIVOTED WEIGHT BIASED VALVE

The invention relates to non-return valves and has for its object to provide an improvement therein.

Non-return valves frequently are used in places where they will remain inoperative, that is to say open, for long periods of time but must close quickly and effectively when back flow of fluid does occur. This means that in the case of a non-return valve having a pivotally suspended closure member, its pivot must remain friction free for very long periods of time and the closure member must close with proper alignment on its seat. The present invention seeks to facilitate these requirements.

According to one aspect of the invention, a nonreturn valve having a pivotally suspended closure member is provided with a simple suspension constituted by aligned load bearing elements engaging flat bearing surfaces so that the closure member is enabled to align itself on its seat by relative movements between said load bearing elements and the flat surfaces which they engage. The aligned load bearing elements may be located at the opposite ends of a spindle from which the closure member is suspended and the flat bearing surfaces may be formed on respective members located on opposite sides of a casing within which the closure member is suspended, portions of the members on which the platforms are formed extending into the casing through aligned apertures formed therein. The load bearing elements may be constituted by cylindrical journals. On the other hand the aligned load bearing elements may be constituted by knife edged portions of a plate member on which the closure member is suspended and an upstanding portion of said plate member may form a mounting for a balance weight. In this case the flat surfaces which are engaged by the opposite ends of the spindle or the knife edged portions, as the case may be, will preferably be located beneath a removable cap which closes an aperture in the casing. In this case, said surfaces may be the basal surfaces of aligned slots formed in the casing or may be surfaces of metal plate members located beneath said removable cap, said plate members preferably being formed with aligned tabs for the abutment of the plate member on which the closure member is suspended. The removable cap may be of domed form and the balance weight may be of half round flat form, upstanding within said cap when the valve is closed.

According to another aspect of the invention, there is provided a non-return valve having a closure member pivotally suspended as described above, the closure member including a flexible sealing element carried by a backing plate, fluid under pressure having access to a space between the backing plate and flexible sealing element when the valve is closed, whereby the flexible sealing element is caused to mould itself to the shape of the valve seat against which the closure member has been caused to abut. The flexible sealing element may be clamped against the backing plate by a clamping plate slightly smaller in diameter than the diameter of the flow passage so that there is formed an annular space between the periphery of said clamping plate and the internal surface of the flow passage when the valve is closed into which the flexible sealing element tends to balloon when acted upon by fluid pressure acting between the backing plate and said sealing element.

Figure 2:
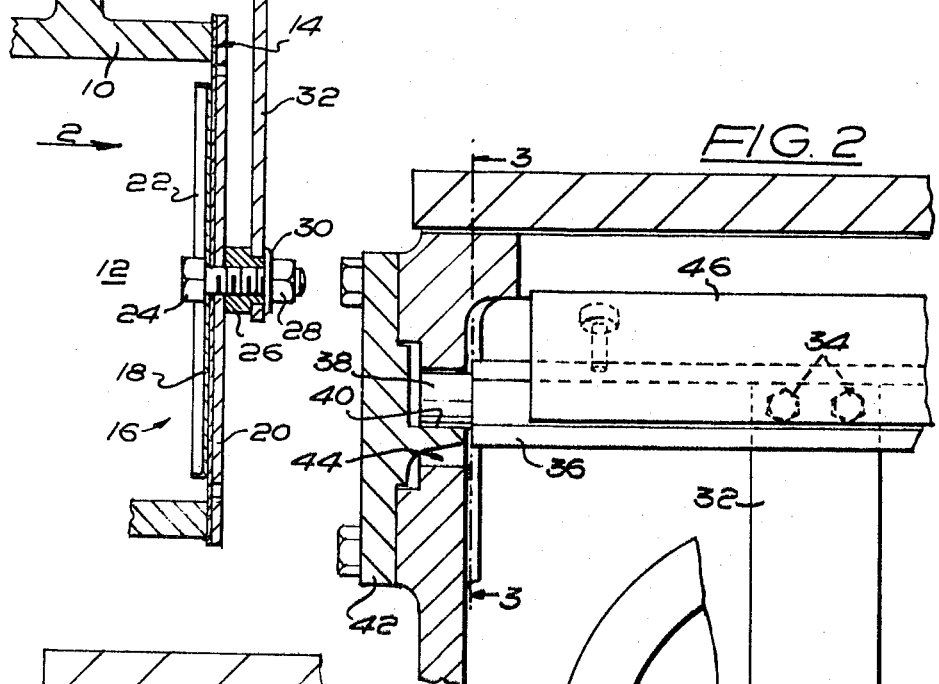
Figure 3:
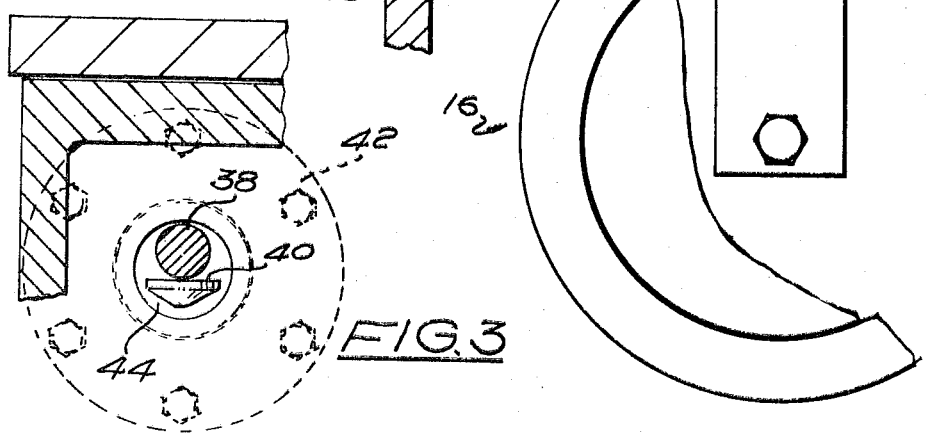
Figure 4:
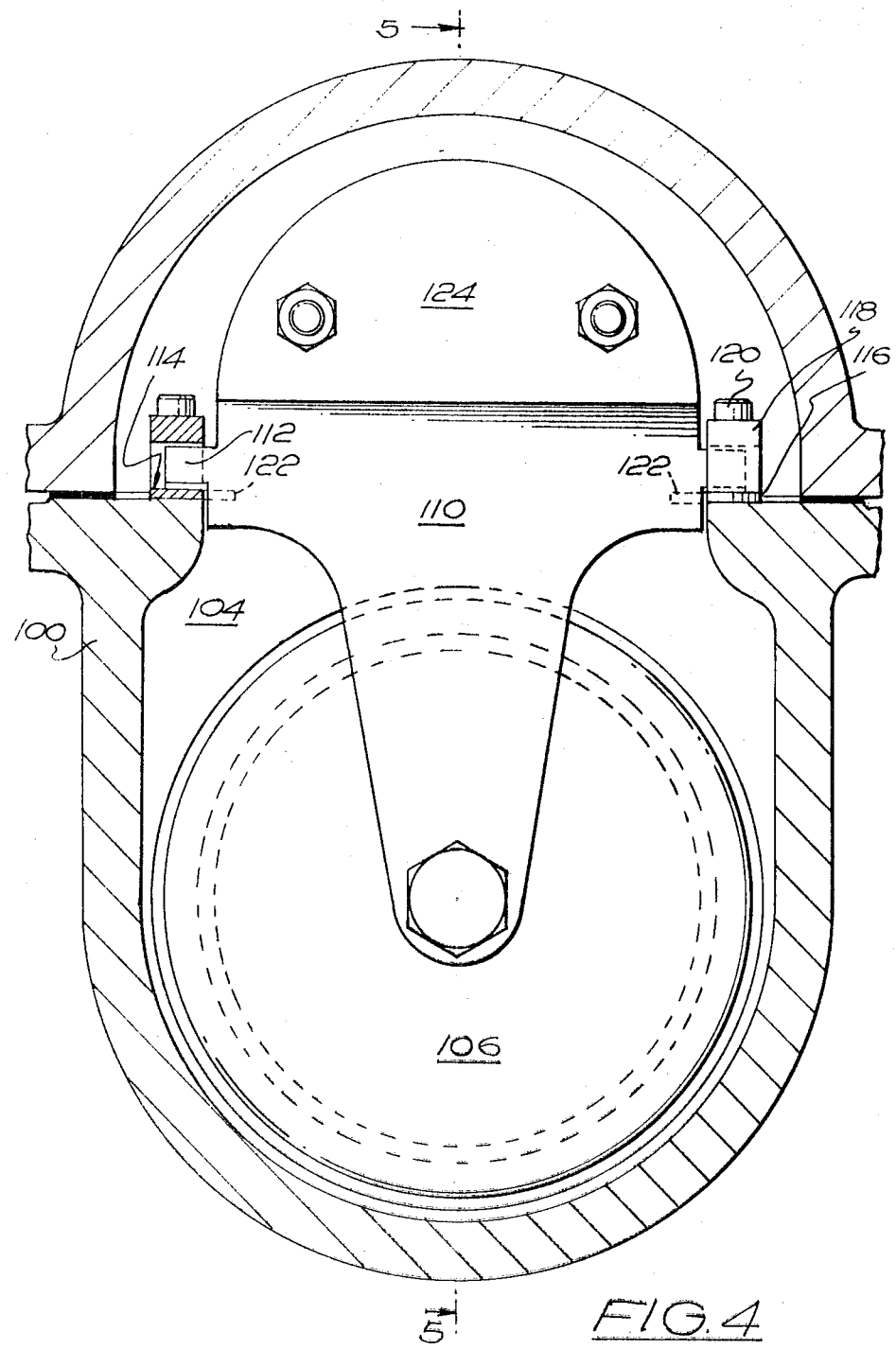
Figure 5:
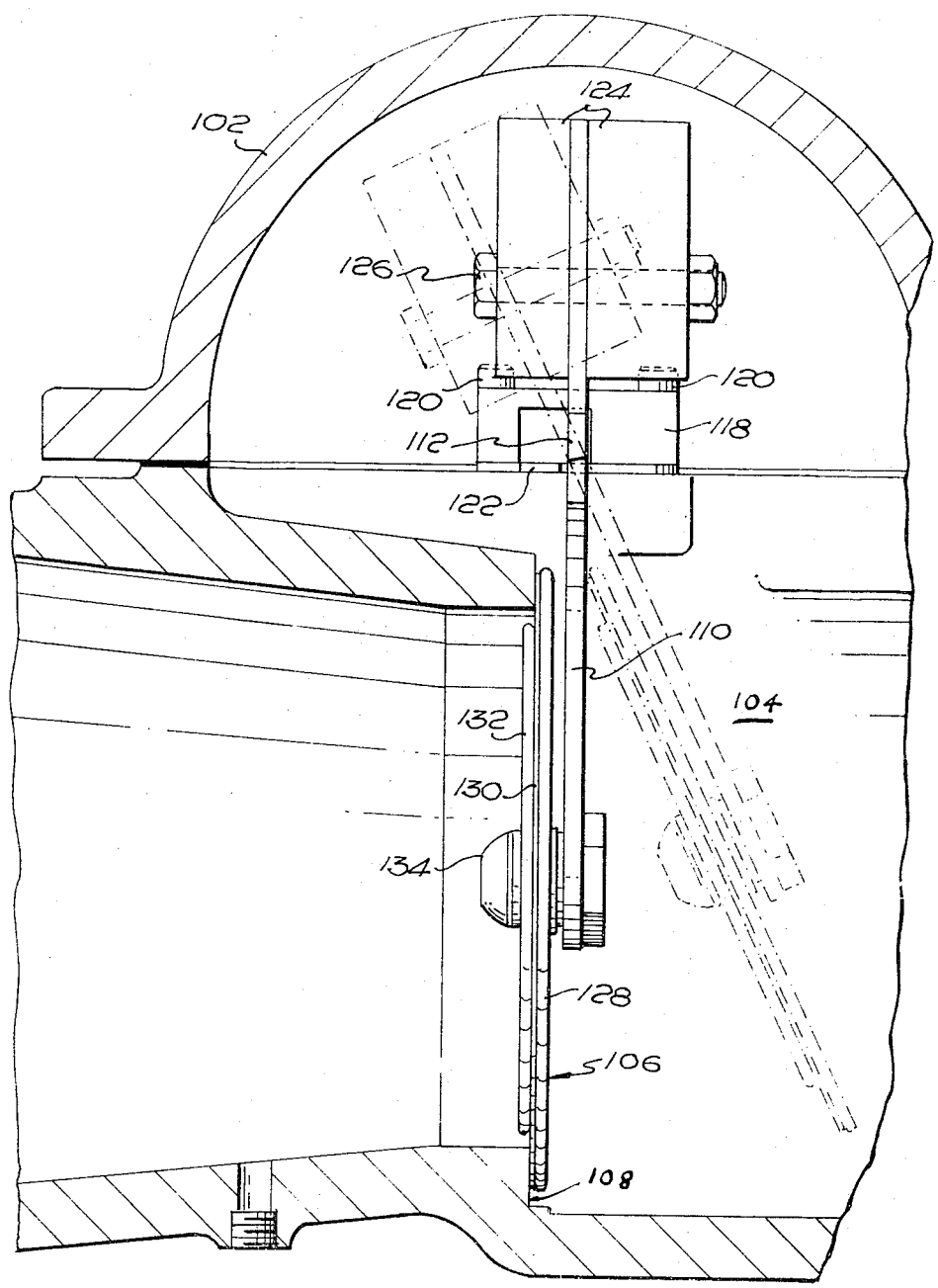
Figure 6:
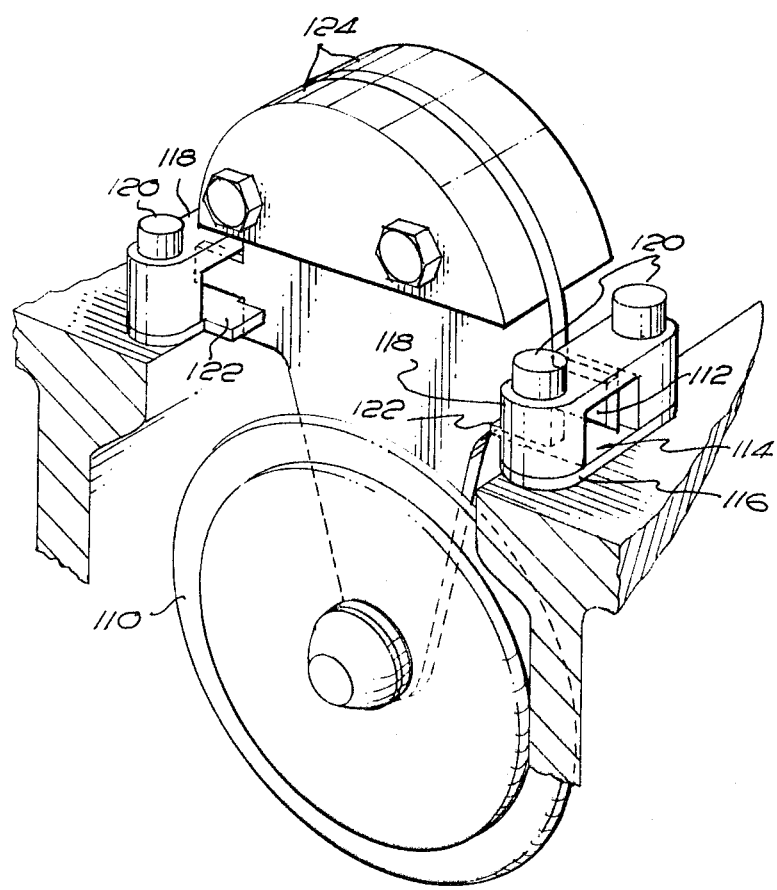
Figure 7:
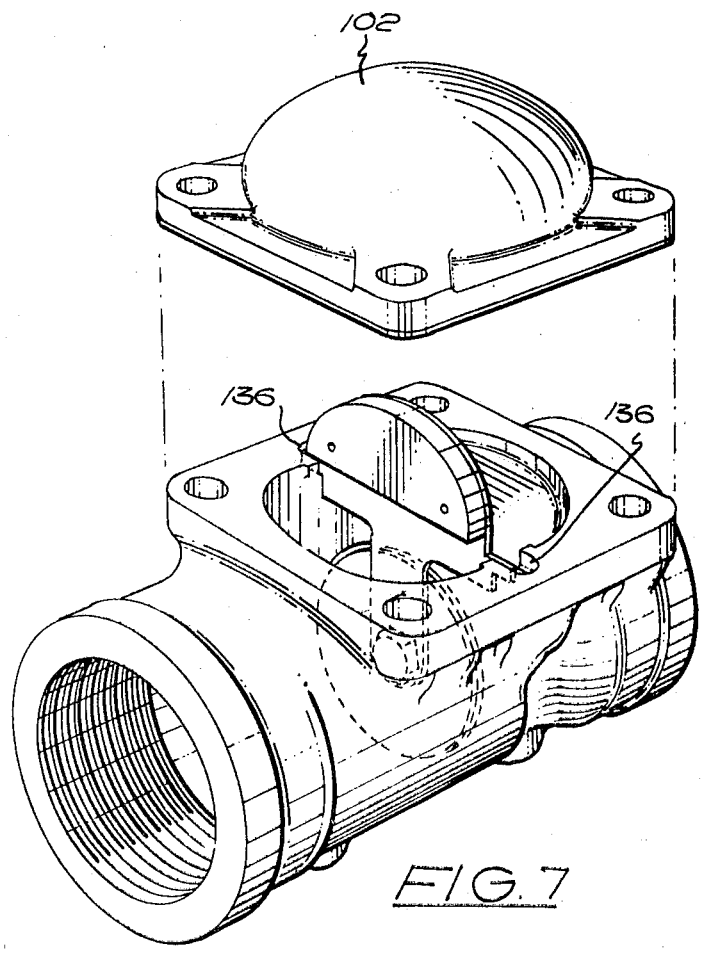

In order that the invention may be fully understood and readily carried into effect, the same will now be described, by way of example only, with reference to the accompanying drawings, of which:

FIG. 1 is a sectional view of a closure member and suspension means of a non-return valve embodying the invention, the closure member being shown in a closed position, FIG. 2 is a view looking in the direction of arrow 2 in FIG. 1, and FIG. 3 is a scrap view on the line 3—3 in FIG. 2, FIG. 4 is a transverse section through a modified form of the valve, FIG. 5 is a sectional view on the line 5—5 in FIG. 4, FIG. 6 is a perspective view of certain parts of the valve, and FIG. 7 is a perspective view of a further valve with a top cover removed.

Referring now to FIGS. 1 to 3 of the drawings, a non-return valve is provided with a casing 10 (only part of which is shown in the drawings) through which extends a flow passage 12. A valve seat 14 is formed within the casing and a closure member generally indicated 16 is shown in engagement with said valve seat.

The closure member 16 includes a flexible sealing element 18 carried by a backing plate 20, said sealing element being clamped against the backing plate by a clamping plate 22 which as can be seen in FIG. 1 is slightly smaller than the diameter of the flow passage so that in the instant example the radial width of the space between the periphery of the backing plate and the wall of the flow passage is several times the thickness of the flexible sealing element. The clamping plate is connected to the backing plate by a single bolt 24 at its centre, said bolt extending through the clamping plate 22, the sealing element 18, the backing plate 20 and a distance piece 26. A nut 28 and washer 30 clamps the assembly tightly together and serves also to connect the closure member to one end of a suspension link 32 from which the closure member depends, a spigot portion of the distance piece extending through a hole in said link as shown.

The other end of the suspension link 32 is connected, by means of a pair of set screws 34, to a spindle 36 (shown in the instant example to be made of hexagonal bar) the opposite ends of which have been machined down to form cylindrical journals 38. The journals are supported on flat platforms 40 which are formed on respective members 42 located on opposite sides of the casing 10, portions of the members on which the platforms are formed extending into the casing through aligned apertures 44.

The weight of the closure member 16 is balanced by means of a balance weight 46 located within the casing and secured by screws 48 to the spindle 36. The balance weight is proportioned so that it reduces the pressure drop which would occur if the closure member was unbalanced whilst ensuring a sufficient closing moment to cause the closure member to seat itself against the valve seat 14 as fluid flow approaches zero. There is thus provided a very simple suspension for the closure member by virtue of which the closure member is enabled to align itself on its seat, that is to say by relative movements between the journals 38 and the flat surfaces which they engage.

This fact, in combination with the form of resilient seal provided, has been found to result in very efficient closure of the valve and trouble free operation for an extended period of time. (The form of resilient seal provided is such that there is effected what may be called a primary seal when the sealing element contacts the surface of the valve seat and what may be called a secondary seal when fluid pressure causes the sealing element to "balloon" into the annular space between the periphery of the clamping plate and the internal surface of the flow passage. This ballooning action of the sealing element causes the latter to mould itself to the form of the transition between the surface of the valve seat and the internal surface of the flow passage. This transition may be a sharp edge or may be a curved surface. However, it has been found that, generally, that is to say in valves subjected to fluid pressures between say 0.05 inch $H_2O$ gauge and 100 lbs. per square inch, the radial width of the space between the periphery of the clamping plate and the wall of the flow passage should be approximately four times the thickness of the flexible sealing element for a marked moulding action to occur but must not exceed about eight times its thickness since with a space above this width it has been found that, at relatively high pressures, there is a tendency for the sealing element to be blown out). The fact that the closure member can align itself on the valve seat is especially useful when this form of resilient seal is provided. Furthermore, it will also be understood that the simple form of suspension employed is inherently such that it will remain friction free for very long periods of time without attention.

Referring now to FIGS. 4 to 6, in a modified form of non-return valve embodying the invention, the casing 100 is provided with a removable cap 102 which gives access to a space 104 within which the closure member 106 is disposed.

The closure member, which is shown in engagement with the valve seat 108, is suspended on a plate member 110 which, as best seen in FIG. 4, is formed with laterally projecting knife edged portions 112 which constitute aligned load bearing elements. Said knife edged portions engage flat surfaces 114 of metal plate members 116 located beneath the cap 102 and are very loosely retained in position by bridge pieces 118 secured to the casing by cap head screws 120. The plate members 116 are provided with aligned tabs 122 for the abutment of the plate member 110.

An upstanding portion of the plate member 110 on which the closure member is suspended is of half round shape and forms a mounting for a pair of balance weights 124 which are of similar shape and secured thereto by bolts 126. The removable cap 102 is of domed form to accommodate the balance weights and to allow their swinging movement, as shown in chain-dotted lines in FIG. 5, when the valve is opened.

The closure member is of the same general construction as that of the previously described example, that is to say that it includes a backing plate 128, a flexible sealing element 130 carried by the backing plate, and a clamping plate 132 slightly smaller than the diameter of the flow passage. Also as in the previously described construction, the closure member is connected to the plate member 110 by a single bolt 134 at its centre in a manner which allows the closure member to align itself against the valve seat. In this particular case, however, no special provision has been made to allow the access of fluid under pressure between the sealing element and the backing plate. It has been found that leakage of fluid pressure between these two elements has caused the desired "ballooning" of the sealing element to effect the so-called secondary seal referred to above. However, it will be understood that the radial width of the space between the periphery of the backing plate and the wall of the flow passage must lie within the limits defined in connection with the previously described example.

Referring now to FIG. 7, in a somewhat simplified version of the valve just described the metal plate members 116 and the bridge pieces 118 have been omitted and the flat surfaces on which the knife edged portions of the plate member are mounted are the basal surfaces of a pair of aligned slots 136 which have been machined in the joint face on which the cap 102 is bolted.

It will be understood that in each of the constructions of valve illustrated the arrangement is such that the closure members are capable of pivotting completely out of the flow passages during normal operation to allow uninterrupted flow. In each case the size and shape of the balance weight is such that it has been found that the pressure drop across the valve is very low indeed. The appropriate size and weight can of course be determined by trial and experiment.

Various further modifications could of course be made without departing from the scope of the invention. For example, the construction of the closure member itself may be varied in numerous ways and need not necessarily incorporate the "ballooning" of a sealing element as referred to above.

What I claim and desire to secure by Letters Patent is:

1. A non-return valve comprising:
   a casing having an aperture therein;
   a valve seat formed within said casing;
   a closure member disposed within said casing for movement towards and away from said valve seat;
   support means connected to said closure member for movement of said closure member towards and away from said valve seat, said support means comprising a plate member having an upstanding portion and oppositely extending knife-edged portions constituting load bearing elements;
   metal plate members located within said casing and constituting flat bearing surfaces engaged by said knife-edged portions, said metal plate members having aligning means against which the plate member of said support means can abut for aligning said closure member with said valve seat when the valve is closed;
   a balance weight mounted on the upstanding portion of the plate member of said support means; and
   a removable cap which closes the aperture in said casing and which can be removed to reveal said flat bearing surfaces engaged by said aligned load bearing elements.

2. A non-return valve according to claim 1, in which the removable cap is of domed form and the balance weight is of half round flat form, upstanding within said cap when the valve is closed.

3. A non-return valve according to claim 1, the closure member including a flexible sealing element carried by a backing plate having an aperture therein, fluid under pressure having access to a space between the backing plate and flexible sealing element through said aperture when the valve is closed, whereby the flexible sealing element is caused to mould itself to the shape of the valve seat against which the closure member has been caused to abut.

4. A non-return valve according to claim 3, in which the flexible sealing element is clamped against the backing plate by a clamping plate slightly smaller in diameter than the diameter of the flow passage so that there is formed an annular space between the periphery of said clamping plate and the internal surface of the flow passage when the valve is closed into which the flexible sealing element tends to balloon when acted upon by fluid pressure acting between the backing plate and said sealing element.

* * * * *